United States Patent Office 3,481,359
Patented Dec. 2, 1969

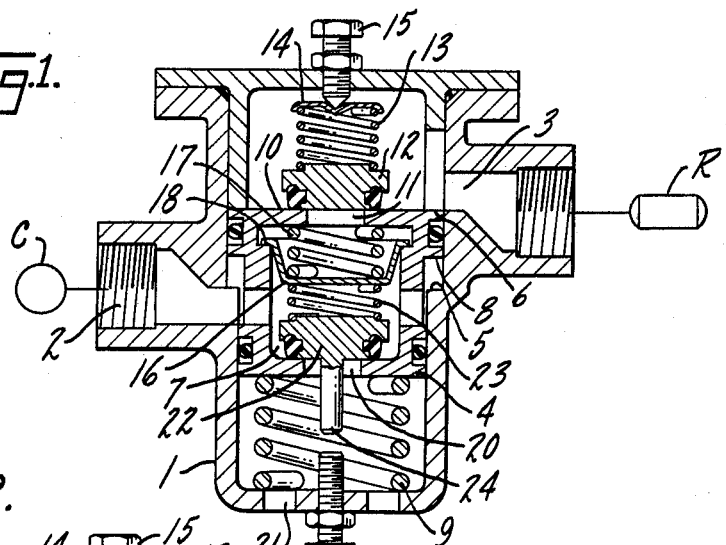
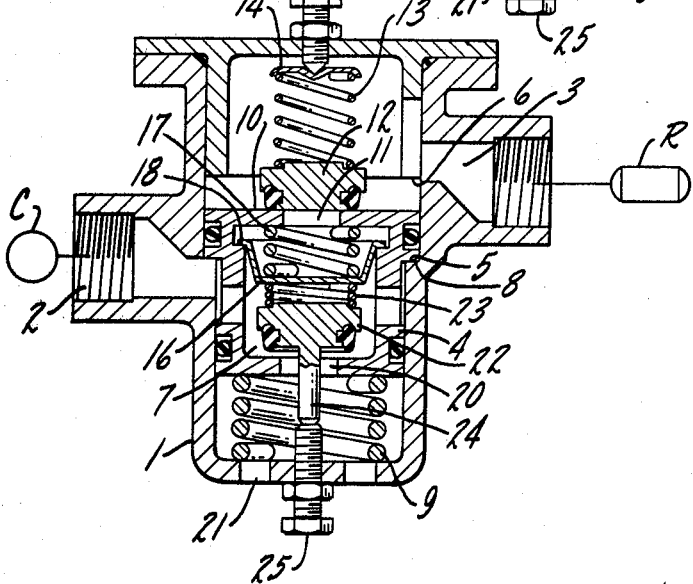
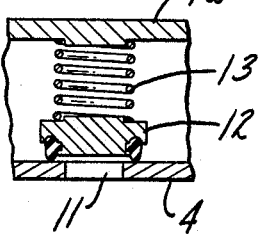
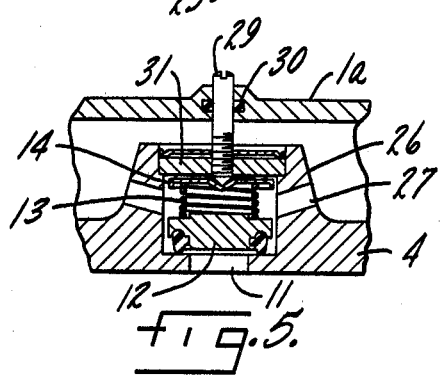
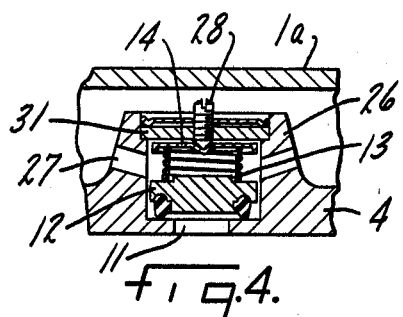

3,481,359
COMPRESSOR GOVERNOR ASSEMBLY
Werner Kobnick, Heidelberg, Germany, assignor to Berg Mfg. & Sales Co., a corporation of Illinois
Filed Mar. 8, 1967, Ser. No. 621,627
Claims priority, application Germany, June 1, 1966, 1,550,120, B 87,392
Int. Cl. G05d 16/02; F04b 49/00; F16t 1/14
U.S. Cl. 137—119         12 Claims

ABSTRACT OF THE DISCLOSURE

An automatic governor incorporating a piston having an area continuously exposed to a reservoir and an area continuously exposed to a compressor, a pair of valve elements controlling passages in the piston and spring urging the valves toward closing position and the piston against reservoir pressure. A yielding filter is provided between the compressor and reservoir. Adjustable abutments determine the pressures and piston-positions at which the valves open, whereby the compressor will be communicated with the reservoir upon diminution of reservoir pressure to a predetermined level and the compressor will be communicated with atmosphere when the reservoir pressure reaches a second predetermined level, said communication of the compressor with the reservoir and with atmosphere being rapidly accomplished by a snap-action of the governor elements.

---

This invention relates to air pressure systems and has particular relation to a governor assembly for the compressor and reservoir of such systems.

One purpose of the invention is to provide a governor assembly effective automatically to communicate a compressor with a reservoir when reservoir pressure is below a first predetermined level and to communicate said compressor with atmosphere when the reservoir pressure reaches a second predetermined level.

Another purpose is to provide a compressor governor assembly productive of a rapid, snap-action switchover of a compressor from communication with a reservoir to communication with atmosphere and from communication with atmosphere to communication with a reservoir.

Another purpose is to provide a compressor governor assembly having elements adjustable to control the reservoir pressures at which a compressor will be communicated with the reservoir and with atmosphere.

Another purpose is to provide a compressor governor assembly having elements adjustable to produce independent control and predetermination of pressures at which a compressor will be communicated with a reservoir and with atmosphere.

Another purpose is to provide a governor assembly automatically responsive to predetermined reservoir pressures to connect a compressor with the reservoir or with atmosphere.

Another purpose is to provide a compressor governor assembly which shall avoid the employment of measuring instruments, electrical contacts, conduits, intermittent compressor operation and delayed switchover of a compressor between atmosphere and a reservoir.

Another purpose is to provide a compressor governor assembly capable of fine adjustment and setting of upper and lower reservoir governor-actuating pressures.

Another purpose is to provide a compressor governor assembly of maximum simplicity and economy in manufacture and operation.

Other purposes will appear from time to time during the course of the specification and claims.

The invention is illustrated more or less diagrammatically in the accompanying drawings, wherein:

FIGURE 1 is a cross-sectional view illustrating the parts in a first position;

FIGURE 2 is a view similar to that of FIGURE 1 and illustrating the parts in another position;

FIGURE 3 is a detailed view illustrating a variant form of one part of the assembly of the invention;

FIGURE 4 is a detailed view illustrating another variant form of a part of the assembly of the invention; and FIGURE 5 is a detailed view illustrating another variant form of a part of the assembly of the invention.

Like parts are indicated by like numerals throughout the specification and drawings.

Referring now to the drawings, and particularly to FIGURE 1, the numeral 1 generally designates a housing. The housing 1 defines a chamber having a compressor port 2 and a reservoir port 3 communicating therewith. Compressor C is connected to port 2 and reservoir R is connected to port 3. Reciprocal within the chamber in housing 1 is an elongated, differential piston 4. The piston 4 is movable between a lower stop 5 and an upper stop 6. Piston 4 has an interior chamber area 7 in constant communication with the port 2 and compressor pressure from port 2 is deliverable beneth the annular surface 8 of the enlarged portion of the differential piston 4. A smaller portion of differential piston 4 is engaged by a spring 9 operative against piston 4 and housing 1 to urge the larger surface 10 of piston 4 upwardly against seat 6. It will be observed that the enlarged surface 10 of piston 4 is reciprocal between ports 2 and 3, the enlarged surface 10 being presented to port 3, the annular surface 8 being presentable to port 2.

A valve passage 11 is formed in the upper larger surface of piston 4 for communication of the area 7 within piston 4 with the reservoir through port 3. A transfer valve element 12 is urged against surface 10 to close passage 11 by a spring 13 which is in turn engaged by a retainer 14, the retainer 14 being adjustably movable through the mediacy of adjustment element 15 penetrating the wall of housing 1 and in sealing engagement therewith and rotatable thereon for adjustment of retainer 14 and thus of the pretension of spring 13.

Within the inner area 7 of differential piston 4 a filter cup 16 overlies passage 11 to filter air moving from the area 7 through passage 11 to reservoir R. A relatively light spring 17 engages an inner surface of piston 4 and the filter 16 to hold the filter 16 against an annular ledge 18 formed on the inner surface of piston 4.

An exhaust passage 20 is formed in the smaller surface of differential piston 4 for communication with the area of the chamber in housing 1 in which spring 9 is positioned and for communication with exhaust outlets 21 formed in the wall of housing 1. An exhaust valve element 22 engages an inner surface of piston 4 about the passage 20 and is urged thereagainst by a spring 23, the opposite end of which is engaged by filter cup 16, the valve element 22 being effective to close passage 20 against communication of the area 7 with exhaust outlets 21. A post 24 is carried by valve element 22 and extends through passage 20 and into the chamber area occupied by spring 9 in axial alignment with an adjustable abutment element 25 rotatably engaged in the wall of housing 1.

FIGURES, 3, 4 and 5 show variations in part of the assembly, corresponding parts retaining their identifying numerals for clarity and understanding.

Referring to FIGURE 3, it will be observed that the spring 13 is engageable with a wall 1a of housing 1 opposed to the upper or larger surface 10 of piston 4.

In FIGURE 4 the larger upper surface 10 of differential piston 4 has been modified to provide a rise 26 having passages 27 therethrough for communication of passage 11 with reservoir port 3 when a valve 12 is out of closing engagement with passage 11. In the form illustrated in FIGURE 4 the rise 26 carries a fixed plate 31 in which an adjustable abutment 28 is rotatably positioned, the abutement 28 terminating within housing 1 and engaging the spring retainer 14 for adjustment of the pretension of spring 13. Valve 12 and spring 13, as well as retainer 14, are positioned in a chamber defined within rise 26.

FIGURE 5 corresponds substantially to that of FIGURE 4 except for the fact that adjustment element 28 has been replaced by an elongated adjustment element 29, which, as indicated at 30, is sealingly engaged with the opposed housing wall 1a in slidable and rotatable engagement therewith, the member 29 being threadably rotatable in plate 31 for adjustment of retainer 14 and spring 13 and extending outwardly of housing 1.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

The use and operation of the invention are as follows:

A compressor C is connected to port 2 and a reservoir R is connected to port 3. In FIGURE 1 the parts are shown prior to start-up of the compressor C. It will be observed that the area 7 within differential piston 4 is in constant communication, at all positions of piston 4, with the compressor C. The compressor is started and the pressure within area 7 rises to a predetermined level, set by the pretension of spring 13 and sufficient to unseat valve element 12. Said pressure will then flow through filter 16, passage 11 and port 3 to fill the reservoir.

The air filter 16 is generally cup-shaped, having an annular flange seatable upon ledge 18 within differential piston 4 and urged thereagainst by a relatively light spring 17. Should the filter become clogged with deleterious particles, the pressure entering area 7 from the compressor through inlet 2 will move the filter 16 upwardly against the action of spring 17 to provide for by-passing of the air around the filter 16 and outwardly through passage 11 when valve 12 is unseated.

As the reservoir pressure builds up the same is exerted against the upper surface 10 of piston 4 to move the piston 4 downwardly against the action of spring 23 and the pressure delivered at port 2. When the piston 4 has moved a sufficient distance, the post or pin 24 will be brought into contact with abutment 25, the position of the latter having been adjustably preset to provide for such contact when the pressure in the reservoir reaches a predetermined level. Continued downward movement of piston 4 will separate valve 22 from its seat closing passage 20.

Immediately upon the slightest movement of valve element 22 off its seat to expose passage 20, as a result of the contact of post 24 with abutment 25, the pressure within area 7 will immediately escape through passage 20 and exhaust outlets 21 to atmosphere and the pressure in the differential piston will drop very quickly, as will the pressure acting on the annular surface 8. Thus a substantial differential is rapidly created between the reservoir pressure acting upon the larger surface 10 of piston 4 and the pressure acting on surface 8 and within area 7 and the differential piston 4 is snapped abruptly downwardly, the valve 22 being further moved away from its seat about passage 20 to further open passage 20. Release of pressure in area 7 also produces immediate closing of valve 12 upon passage 11. The resulting position of the parts is illustrated in FIGURE 2 wherein the compressor C is delivering fluid pressure through outlets 21 to atmosphere. With the compressor thus out of communication with the reservoir, the compressor continues to run without load and is cooled by the air drawn therethrough, increasing the life of the compressor and its effectiveness upon reengagement with the reservoir.

With the parts in the position of FIGURE 2 the piston of differential piston 4 is governed by the differential between the reservoir pressure acting upon the larger surface of piston 4 and the spring 9 acting in the opposite direction upon the smaller surface of piston 4. As the pressure in reservoir R is consumed and drops in value, the piston 4 moves upwardly in response to the action of spring 9. When the piston 4 has moved upwardly a sufficient distance, contact is made with valve element 22 and passage 20 is closed. When the spring 13 is pretensioned at a relatively low or weak level, the early buildup of pressure in area 7 as valve element 22 first closes will produce a substantially momentary unseating of valve element 12, the pressure in area 7 being substantially equal to the pressure above piston 4, i.e. the reservoir pressure. This enables the spring 9 to rapidly move piston 4 upwardly, firmly closing the valve element 22 on passage 20 and snapping the piston 4 into the position shown in FIGURE 1.

The reservoir low pressure, that is the predetermined pressure to which the reservoir is permitted to fall before reengagement of the compressor, is controlled by the strength of spring 13. If, for example, the adjustable abutment 15 is turned inwardly, the pretension of spring 13 is increased. When the pressure in the reservoir increases and piston 4 moves upwardly, the valve element 12 will be held in closing position on passage 11 with greater force and the compressor pressure entering inlet 2 and filling area 7 will have to be substantially higher than the reservoir pressure in order to open valve element 12. The differential piston 4 is, in such case, upwardly urged by such higher compressor pressure in area 7 and against annular surface 8 and the switchover upward movement of piston 4 is rapid, the piston 4 snapping into the position shown in FIGURE 1 when the compressor pressure reaches a predetermined value above that in the reservoir.

Thus, with a relatively weak force in spring 13, the spring 9 is effective to snap the piston 4 into the position of FIGURE 1. With a relatively strong force in spring 13 the compressor pressure, added to the action of spring 9, will overcome the reservoir pressure acting on surface 10 to snap the piston into the position of FIGURE 4. Thus a relatively light force in spring 13 will provide for recommunication of the compressor with the reservoir at a relatively low reservoir pressure and a greater force in spring 13 will provide for such communication at a relatively higher pressure in the reservoir. Similarly, the upper reservoir pressure level at which the governor assembly of the invention switches over from the position of FIGURE 1 into the atmosphere-communicating position of FIGURE 2 is determined by the position of stop abutment 25, while the lower reservoir pressure limit at which the assembly of the invention switches over from the exhausting position shown in FIGURE 2 into the reservoir-communicating position of FIGURE 1 is determined by the pretension or bias spring 13 which is in turn commanded by the position of adjustable stop abutment 15 and retainer 14 engaged therewith.

In the form of the invention shown in FIGURES 1 and 2 the adjustments of the upper and lower critical reservoir pressures are not entirely independent of each other. Varying the lower stop 25 affects the prestress of the spring 13 because the switchover action of piston 4 occurs when the pin 24 separates from stop 25. Of course, when the upper reservoir pressure limit is selected by adjustment of the top 25 it is thereafter possible to adjust minimum pressures through the media of stop 14. In FIGURE 3 the spring 13 engages a wall 1a of housing 1 opposed to the upper, larger surface of differential piston 4. In such case, the lower reservoir pressure, that is the pressure at which the compressor is again communicated with the reservoir to charge the same, is determined by the initial selection of the spring 13 which is, of course, not adjustable.

FIGURES 4 and 5 illustrate variance in means for adjusting the tension of spring 13 and thus the pressure at which element 12 may be unseated. In the embodiments of FIGURES 4 and 5 an independence of the adjustability of the upper and lower reservoir pressures is achievable. The plate 31, in each case, forms a fixed surface supporting the adjustable abutments 28 or 29. The plates 31, however, are secured to and move with the differential piston 4. The retainer 14, spring 13 and valve element 12 are likewise carried by and movable with the piston 4. Adjustable abutment 28 is engageable by a suitable tool to adjust the stress of spring 13 upon removal of the wall 1a which may, for example, form a cover plate for the housing 1. Adjustable abutment 29 extends through the wall 1a in rotatable, slidable sealing engagement therewith and has an external end surface engageable by a suitable tool for adjustment of the tension of spring 13. Thus in the embodiments of FIGURES 4 and 5 the position of abutment 25 will continue to govern the upper reservoir pressure limit at which the compressor is communicated with atmosphere. The position of abutment 25 will not, however, affect the pretension of spring 13 and thus will not affect the lower reservoir pressure limit since the spring 13, valve element 12, plate 31 and adjustable abutment 28 or 29 are carried by piston 4 and are not affected by the position of piston 4 within housing 1.

There is claimed:

1. A compressor governor assembly including a housing, a differential piston reciprocal in said housing and having major and minor diameter portions, a first port communicating a compressor with one side of said piston major portion at all positions of said piston, a second port communicating a reservoir with the opposite side of said piston major portion at all positions of said piston, an exhaust outlet in said housing, a first passage positioned in said piston to communicate said first and second ports, a first valve element positioned to control said first passage, a second passage positioned in said piston to communicate said first port with said exhaust outlet, a second valve element positioned to control said second passage, a yielding member engaging said piston and housing to urge said piston against the action of fluid pressure upon said opposite side of said piston.

2. The structure of claim 1 characterized by and including an abutment adjustably carried by said housing and positioned to engage said second element when said piston has moved a predetermined distance against the action of said yielding member.

3. The structure of claim 1 characterized by and including a spring engaging said first valve element to urge the same toward a position closing said first passage and an adjustment element adjustably carried by said housing and engaging said spring.

4. The structure of claim 1 characterized by an including a spring engaging said first valve element to urge the same toward a position closing said first passage and an adjustment element adjustably carried by said piston and engaging said spring.

5. The structure of claim 4 wherein said adjustment element extends outwardly of said housing in sealed, slidable and rotatable engagement therewith.

6. The structure of claim 1 characterized by and including a filter member carried by said piston between said first port and said first passage.

7. The structure of claim 6 wherein said filter member is yieldingly urged upon a seat formed on said piston and movable off said seat to by-pass said filter member and communicate said first port directly with said first passage when said filter member is clogged.

8. The structure of claim 1 wherein said first valve element is carried by said piston and characterized by and including a spring carried by said piston and engaging said first valve element to urge the same toward a position closing said first passage.

9. The structure of claim 8 characterized by and including an adjustment element adjustably carried by said piston and engaging said spring to vary the tension thereof.

10. The structure of claim 1 wherein said piston has an internal chamber area continuously in communication with said first port, said first and second passages communicate with said area and said second valve element is carried by said piston in said chamber area.

11. The structure of claim 1 wherein said first valve element is movable toward a position opening said first passage in response to pressure entering from said first port above a predetermined level when said second valve element is in a position closing said second passage.

12. The structure of claim 1 characterized by and including an abutment adjustable on said housing and positioned to engage said second valve element when said piston has moved a predetermined distance in said one direction to open said second passage.

References Cited

UNITED STATES PATENTS

| | | | |
|---|---|---|---|
| 2,403,689 | 8/1946 | Sprague | 137—508 |
| 3,157,198 | 11/1964 | Wanner | 137—108 |

WILLIAM F. O'DEA, Primary Examiner

HOWARD M. COHN, Assistant Examiner

U.S. Cl. X.R.

103—42; 137—108; 230—22